United States Patent [19]

Knaak

[11] Patent Number: 5,787,369
[45] Date of Patent: Jul. 28, 1998

[54] OBJECT DETECTION SYSTEM AND METHOD FOR RAILWAYS

[76] Inventor: Theodore F. Knaak, 8526 Danvers Ct., Orlando, Fla. 32818

[21] Appl. No.: 604,583

[22] Filed: Feb. 21, 1996

[51] Int. Cl.$^6$ .................... B60Q 1/00; G01C 3/00
[52] U.S. Cl. .................... 701/19; 701/301; 701/223; 340/435
[58] Field of Search .................... 364/424.024, 461, 364/456; 180/169; 356/3.09; 382/104, 106; 701/19, 301, 223; 340/435, 436

[56] References Cited

U.S. PATENT DOCUMENTS

| | | | |
|---|---|---|---|
| 3,682,553 | 8/1972 | Kapany | 356/4 |
| 3,725,699 | 4/1973 | Pascoe | 246/114 |
| 3,897,150 | 7/1975 | Bridges et al. | 356/5 |
| 4,179,216 | 12/1979 | Theurer et al. | 356/4 |
| 4,490,038 | 12/1984 | Theurer et al. | 356/5 |
| 5,170,352 | 12/1992 | McTamaney et al. | 364/424.02 |
| 5,235,398 | 8/1993 | Miller et al. | 356/5 |
| 5,331,312 | 7/1994 | Kudoh | 340/541 |

FOREIGN PATENT DOCUMENTS

5-42873  8/1991  Japan.

*Primary Examiner*—Michael Zanelli
*Attorney, Agent, or Firm*—Allen, Dyer, Doppelt, Milbrath & Gilchrist, P.A.

[57] ABSTRACT

An electro-optical detection system and method is provided for detecting the presence of an object on a portion of a railroad track. The system includes a scanning laser rangefinder for monitoring a predetermined volume or area over a length of railroad track and for sensing the presence of an object therealong. The position of the sensed object is determined from the scanning and sensing data, and a signal is provided that is indicative of the presence and position of the sensed object. The signal is used by an oncoming train to initiate avoidance measures and thereby prevent an accident.

22 Claims, 6 Drawing Sheets

OBJECT DETECTION SYSTEM AND METHOD FOR RAILWAYS

BACKGROUND OF THE INVENTION

1. Field of the Invention

The present invention relates to object detection systems and methods, and, more particularly, to systems and methods for detecting objects on railway tracks.

2. Description of Related Art

Objects falling or otherwise moving onto railroad tracks present a potentially dangerous problem for trains, as such objects, if they were to remain on the tracks, could cause derailment and/or damage to equipment, to passengers, and to the object itself, which may be a person, an animal, or another vehicle.

At railroad crossings the current technology comprises active barriers to vehicle traffic with warning lights, or just warning lights. Active barriers and/or the warning lights are activated in response to an oncoming train tripping a switch at a predetermined distance from the crossing.

Without active monitoring of the crossing, however, an oncoming train cannot be signaled that an object is on the tracks. By the time the train operator has visual contact with the crossing area, it is usually too late to stop the train, which can lead to accidents. (It typically takes a mile to slow a train from 60 mph to 10 mph.)

In more remote areas, where rock slides are common, the currently used warning systems employ live wire fences constructed along the tracks. Typically such fences comprise fence posts positioned at intervals of 15–20 feet. Strung between the fence posts is a continuous wire insulated from the posts. Voltage is applied to each end of the wire and energizes a contact relay in the open position. When an object passes through the wire, breaking it, the relay is closed, and an appropriate warning signal is activated. Generally the train operator is informed that a section of wire has been damaged, indicating an object on the tracks, and the train is slowed to avoid damage.

Several problems exist with this system. For instance, if a large object such as a boulder falls onto the tracks and then continues beyond them, the fence is broken and a danger signal is sent, even though the danger does not exist any longer. In addition, the fence must be repaired every time it is broken, which is an extremely expensive and time-consuming task. In the United States, for instance, it is not uncommon in active rock-slide areas for such fences to be repaired several times each week. Often a large rock slide can destroy large sections of fence.

Object detection and range-finding systems are known in the art, such as those disclosed by Kapany (U.S. Pat. No. 3,682,553), Bridges et al. (U.S. Pat. No. 3,897,150), and Aeba (Jap. Pat. No. 5-42873). It is also known to monitor objects at railroad grade crossings (Pascoe, U.S. Pat. No. 3,725,699), the distance between tracks (Theurer et al., U.S. Pat. No. 4,490,038), and the profile of a tunnel or cavity (Theurer et al., U.S. Pat. No. 4,179,216; Miller et al., U.S. Pat. No. 5,235,398).

Previously disclosed systems, however, are not known that can determine the presence and size of an object along an extended length of track, in a user-defined space.

SUMMARY OF THE INVENTION

It is therefore an object of the present invention to provide a system and method for detecting the presence of an object on a railroad track.

It is another object to provide such a system and method for warning an approaching train of the position of a foreign object on the railroad tracks.

It is a further object to provide such a system and method for detecting the size of an object on the railroad tracks.

It is an additional object to provide such a system and method for reducing the cost and labor associated with monitoring the safety of a railroad track.

It is yet another object to provide such a system and method that is adapted to function continuously in an outdoor environment.

It is yet a further object to provide such a system and method that is safe for the human eye.

It is yet an additional object to provide such a system and method that is easy to operate and install.

It is another object to provide such a system and method that reduces the potential for accidents at railroad crossings by warning the train operator of the presence of an object on the tracks.

These and other objects are achieved by the system and method of the present invention for detecting the presence of an object on a portion of a railroad track. The system comprises means for performing a directed-energy scan of a predetermined length of railroad track and means for sensing from the scan the presence of an object along that length of track. Means are further provided for determining the position of the sensed object from the scanning and sensing means and for providing a signal indicative of the presence and position of the sensed object.

In a particular embodiment, the system parameters are set for sensing the presence of an object having a dimension greater than a predetermined size, depending upon the use to which the system is being put. For instance, the requirements in a rock slide area are different from those at a railroad crossing.

In another embodiment, the system further comprises means for protecting the system from adverse climatic conditions, such as precipitation and temperature extremes.

The method of the present invention comprises the steps of performing a directed-energy scan of a predetermined length of railroad track and sensing from the scan the presence of an object along the length of track. Then the position of the object is determined from the scan and sensed data, and a signal is provided that is indicative of the presence and position of the sensed object.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 2 shows the system of FIG. 1 positioned in a protective housing in (a) front view and (b) side view.

DETAILED DESCRIPTION OF THE PREFERRED EMBODIMENTS

A description of the preferred embodiments of the present invention will now be presented with reference to FIGS. 1–5.

General System Configuration

The system of the present invention is for detecting the presence of an object on a portion of a railroad track. The system comprises means for performing a directed-energy scan of a predetermined length of railroad track and means for sensing from the scanning means a presence of an object along the predetermined length of track.

In a preferred embodiment the scanning and sensing means comprise a movable platform controllable over a tilt and a pan axis and a pulsed laser scanning rangefinder mounted thereto. A specific rangefinder that meets the specifications of this type of application is a Riegl LD90-3300-GF pulsed laser rangefinder with an MK42 remote optical head (Riegl Laser Measurement Systems, Orlando, Fla.). The beam emitted by the rangefinder is safe to the human eye; the laser specifications are: wavelength, 904 nm; maximum pulse rate, 100 Hz, divergence 2.8 mrad×2.8 mrad; pulse duration 22 ns; maximum average radiance, 440 mW $cm^{-2}$ $sr^{-1}$; maximum peak radiance, 200 kW $cm^{-2}$ $sr^{-1}$. The beam is steered by a Model PTU-46-17.5 Pan-Tilt platform (Directed Perception, Burlingame, Calif.), which can easily direct the compact and light (<2 lbs.) MK42 optical head.

The system further comprises a processor for performing various control, object detection algorithm execution, and signal communication tasks. A specific processor suitable for use in the preferred embodiments of the system of the present invention comprises a Paravant RHC-44E computer (Melbourne, Fla.). This computer is designed for use in harsh environments, and has two RS232 ports for communication with the pan-tilt platform and the rangefinder and one RS422 port for communication with a relay. The relay may comprise an Optomux 4-Position Single Channel Relay Package (Burlingame, Calif.), which enables the computer to drive up to four relays for external communication of warning signals.

The processor is used to direct the scanning movement of the pan-tilt platform and also to process the rangefinder data to determine the position and the size of the sensed object. In addition, once an object has been sensed to be positioned within the scan volume, the processor is adapted to provide a signal indicative of the presence of the sensed object, so that appropriate action may be taken by an oncoming train.

Typically a minimum object size is incorporated into the system depending upon the specific application. Thus the system will only output a signal if the object has a dimension greater than this predetermined minimum size. The minimum size (surface area) of an object that can be detected by the system is a function of laser beamwidth, scan frequency, and measurement time. These parameters can be chosen, within the capabilities of the system components, to accommodate a balance between minimum detectable object area and total scan time.

Since the scanning will typically be continuous, if the object leaves the track portion of interest, the processor will reset the system to indicate a clear track. For example, a falling rock might roll over the track but continue to a location where it does not pose a danger to an oncoming train. Similarly, an animal might walk onto and stay on the track for a time and then leave as the train is approaching, again posing no danger to the train (or the animal).

The processor further is capable of storing a time history of the presence, the size, and the position of all sensed objects, which can be used in subsequent analyses of activity surrounding that portion of track and also to assess the system's performance.

The processor may also include a modem or other communications components and software for providing contact with a second, remote processor residing, for example, at a central office facility. These components can be used to transfer data to the central office or to receive from the office a control signal for altering a system parameter remotely, such as changing a scan rate or area. In addition, a diagnostic test on a system component can be performed remotely, to relay system data to the central office and thus possibly avoid a visit to the site.

The processor further comprises software for integrating the range data to form a partial three-dimensional image of the sensed object. That is, a three-dimensional map of the side of the object facing the rangefinder can be formed. Then, from a stored library of known test objects, such as a car or one of the animals likely to be found in the area, the software can compare the partial three-dimensional image with the stored library. The comparison may be able to identify the sensed object if a match within predetermined limits is found between the sensed object and one of the test objects. A particular use for such a capability is in detecting the presence and length of a passing train.

In order to protect the system from adverse climatic conditions, the components are mounted in an instrument housing, such as an O'Brien Model B5 enclosure (St. Louis, Mo.), which is designed for use in harsh outdoor environments. In addition, a heater is provided for maintaining the temperature within the system's recommended operating range (for instance, an O'Brien Series E, type 200 watt electric heater).

Power may be provided by a standard power supply that takes 110 V AC and distribute 5 and 10 V DC to the components as needed. It is estimated that the system requires, at peak power consumption (wherein the heater, which consumes the majority of the power, is being used) approximately 230 watts.

The Slide Fence Application

This embodiment of the system and method of the present invention (FIGS. 1–3) is for detecting the presence of an object on an extended, generally linear portion of a railroad track, typically in an area subject to rock slides.

Figure 1:
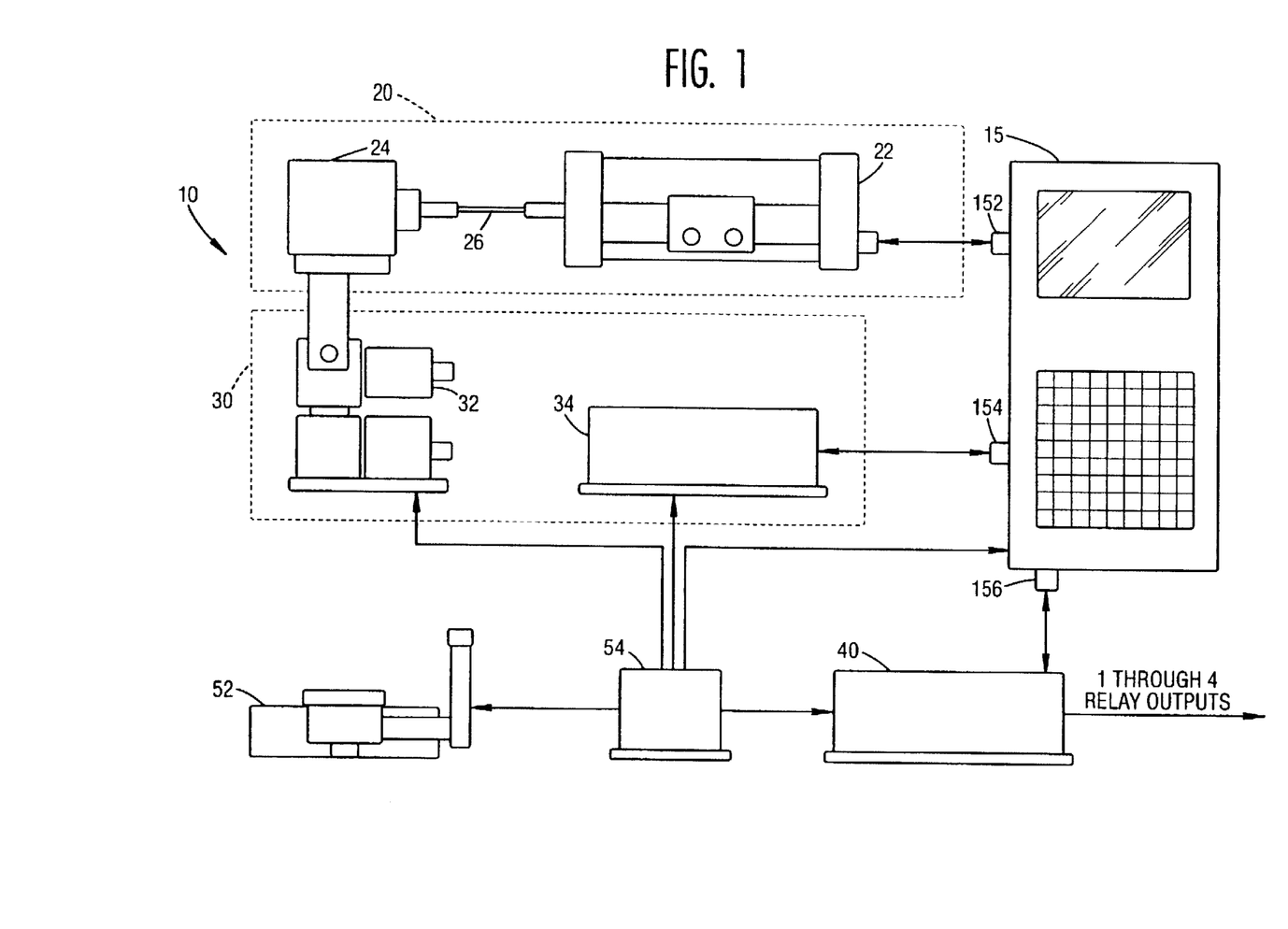
FIG. 1 is a block diagram of the components of the detection system used for a section of railroad track.

As shown in FIG. 1, the system 10 comprises a processor 15 in communication through a first RS232 port 152 with the electronics box portion 22 of a laser rangefinder 20. The electronics box 22 is connected via fiber optics cabling 26 to the optical head portion 24 of the laser rangefinder 20.

The optical head 24 is mounted to a pan-tilt platform 32, which is a component of the pan-tilt system 30. The controller portion 34 of the pan-tilt system 30 is under processor 15 control via a second RS232 port 154.

In this particular application a railroad track is scanned over a length of approximately 200 feet, a width of approximately 15 feet, and a height of approximately 5 feet. This width encompasses the track and 5 feet on either side of the track. (Note that these and the following values are intended to be exemplary only and are not meant to be limiting.)

Figure 3:
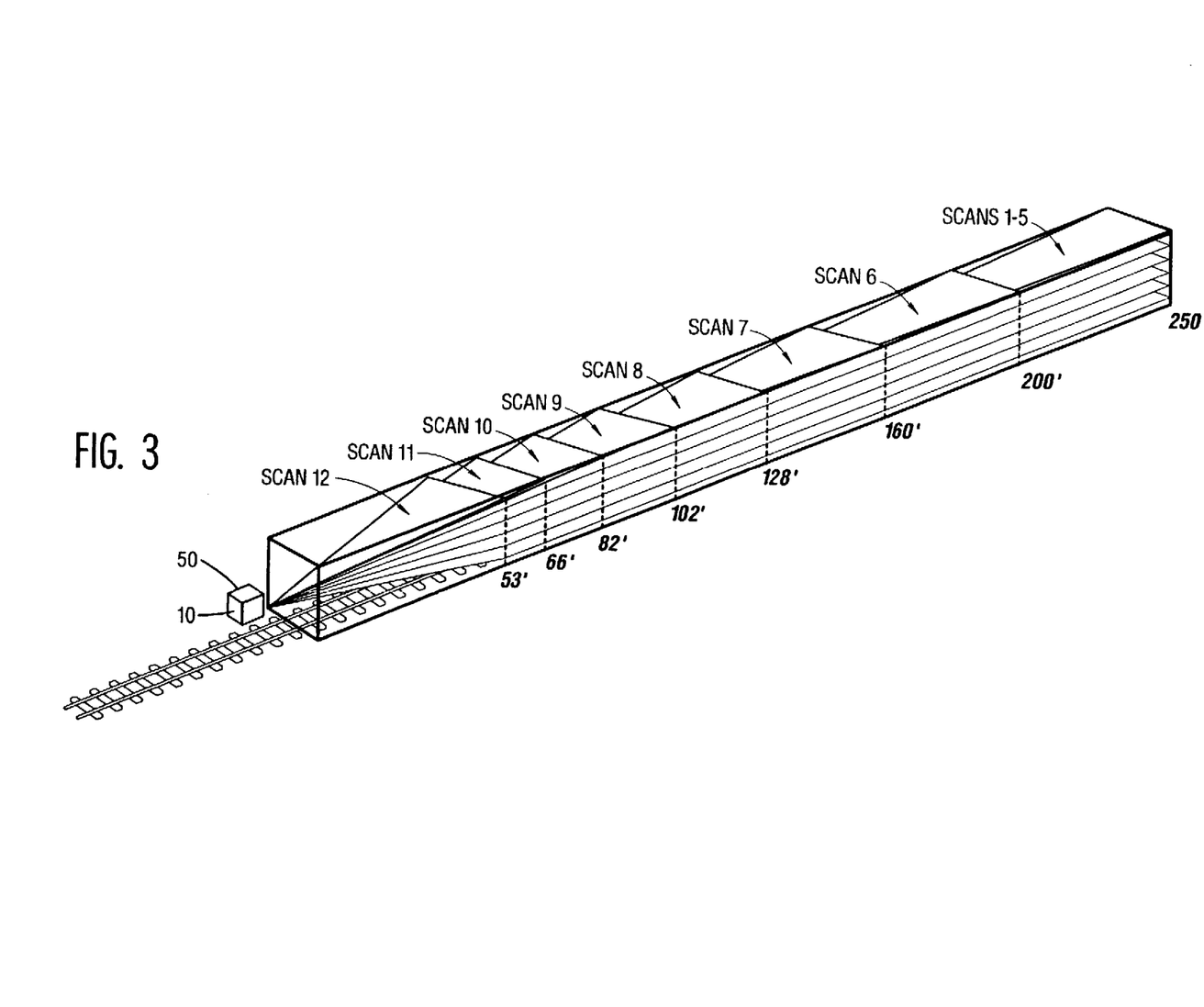
FIG. 3 is a schematic illustration of the scan pattern of the detection system of FIG. 1.

The scanning pattern, which is shown in FIG. 3, consists of 12 horizontal scans over 17 degrees each at an increased elevation. The actual coverage of the sensor exceeds the bounds of the volume defined in FIG. 3, but the processor ignores objects outside the volume. As can be seen, the first 50-foot sector is not included in the coverage area, but this offset enables the horizontal scan to be limited to 17 degrees, providing an overall faster coverage time and avoiding the necessity of scanning over larger angles. The vertical angle in degrees corresponding to a respective scan number is as follows:

| Scan | Vertical Angle (deg) |
|------|----------------------|
| 1    | 0                    |
| 2    | 0.23                 |
| 3    | 0.46                 |
| 4    | 0.69                 |
| 5    | 0.92                 |
| 6    | 1.22                 |
| 7    | 1.58                 |
| 8    | 2.03                 |
| 9    | 2.48                 |
| 10   | 3.04                 |
| 11   | 3.74                 |
| 12   | 4.6                  |

The required spatial resolution is achieved by taking 150 samples per scan, enabling the detection of an object with a minimum surface area of 10 inches×10 inches. If the rangefinder 20 is operated at 20 Hz, each scan will take approximately 7.5 sec, with all 12 scans taking 90 sec. Of course, these and the other system parameters are easily altered as desired to provide a different scanning pattern or to change the spatial resolution to identify smaller objects.

If an object is detected within the scanned volume, the software resident in the processor 15 determines its position. Then the processor 15, via RS422 port 156, outputs a signal to relay 40, which in turn sends a signal to from one to four relay outputs indicative of the presence and position of the sensed object.

Figure 2A:
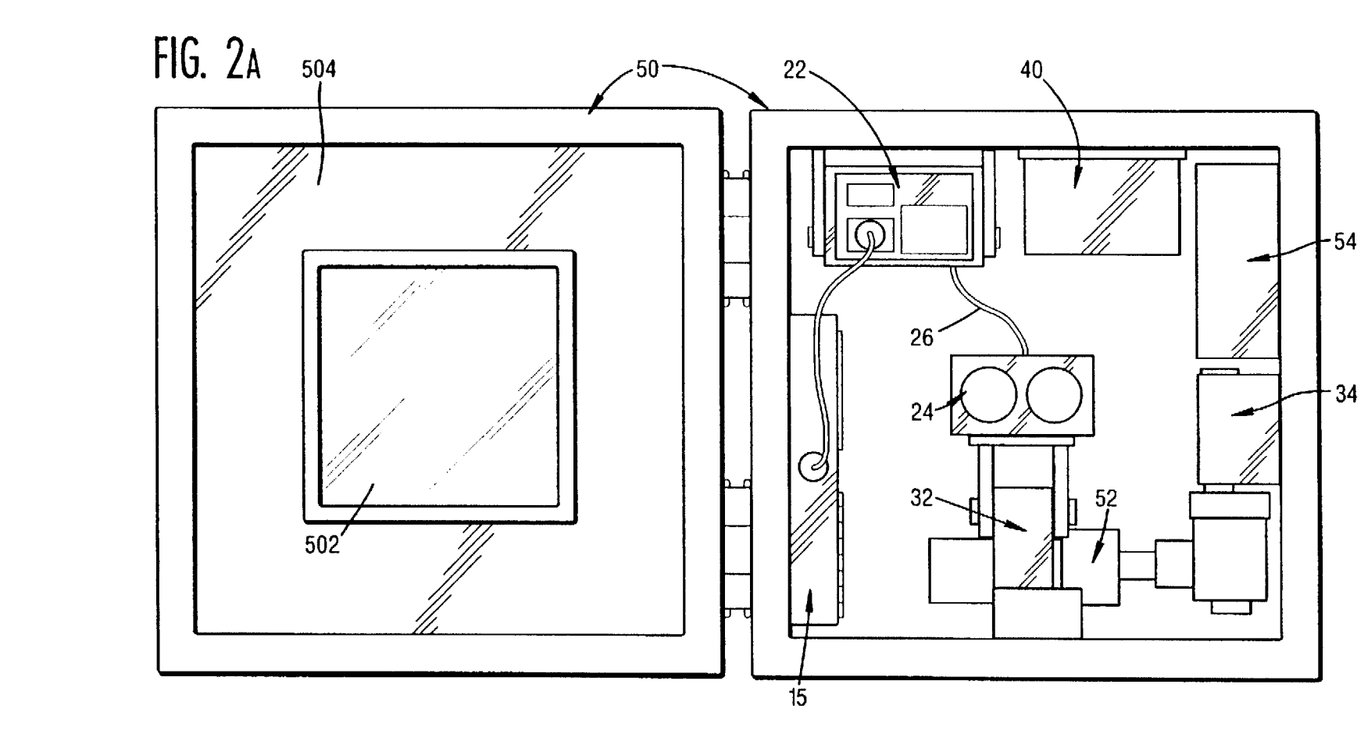
Figure 2B:
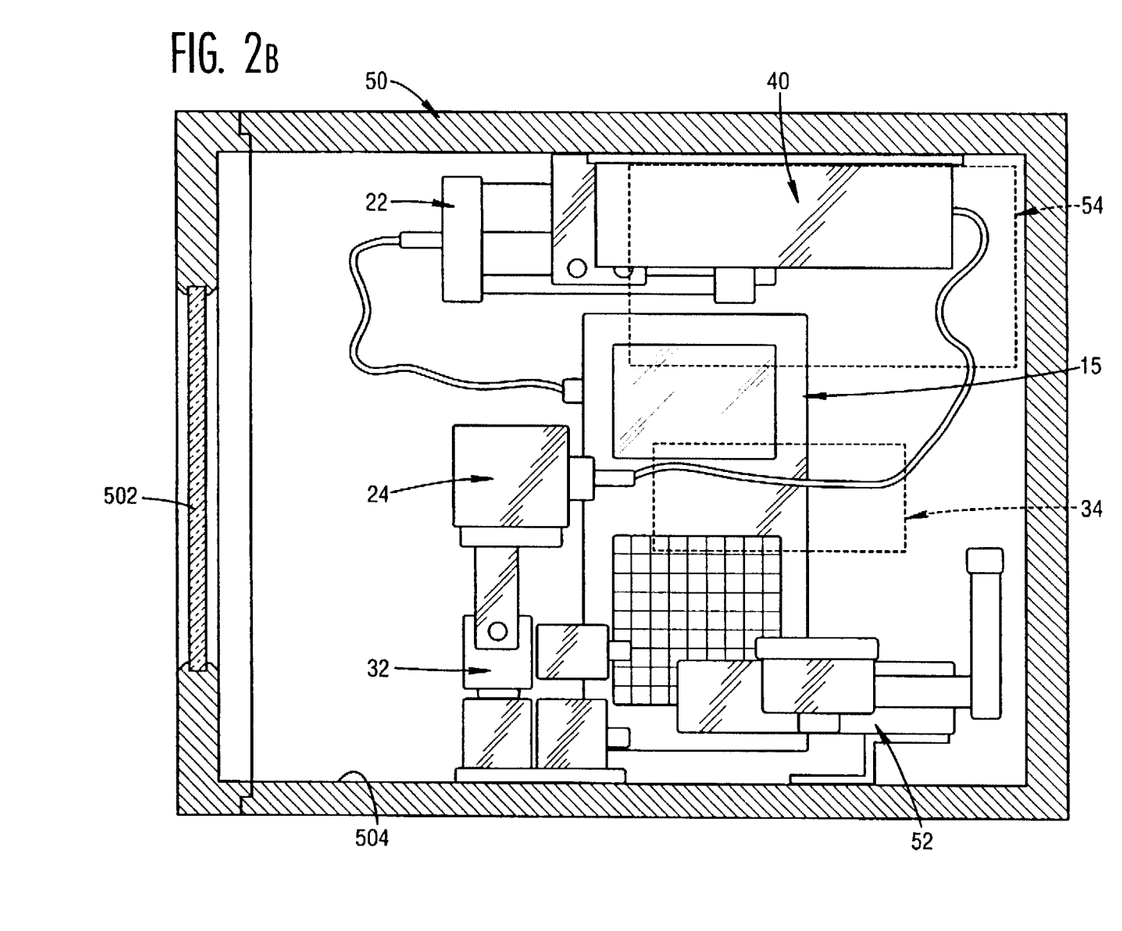

The system 10 further comprises a housing 50 and a heater 52 therein for protecting the system 10 active components from adverse environmental conditions. The system 10 as described herein can tolerate temperatures in the range of –40° to +35° C. An exemplary system 10 layout is shown in FIGS. 2a and 2b, wherein most of the cabling is not shown for clarity. The optical head 24 is situated in front of a window 502 in the enclosure door 504. Sufficient space is left around the platform 32 to permit horizontal and vertical scanning. The exemplary components recited above can be accommodated in an enclosure of approximately 16" (w)× 16" (h)×21" (1).

Each component in the system 10 is positioned for easy access to permit development and fine tuning. Sufficient lengths of cable should be provided to enable the removal of the computer 15 in the field while maintaining communication with the rest of the system.

It may also be necessary in certain environments to provide an additional enclosure to protect the housing 50 from falling rock, trees, and vandalism. Such an outer shell could comprise, for example, a box of welded steel plates with an opening to accommodate the laser window.

The power supply 54, as mentioned above, supplies power to the heater 52, the relay 40, the rangefinder electronics box 22, the pan-tilt controller 34 and platform 32, and the computer 15.

The Railroad Crossing Application

Figure 4:
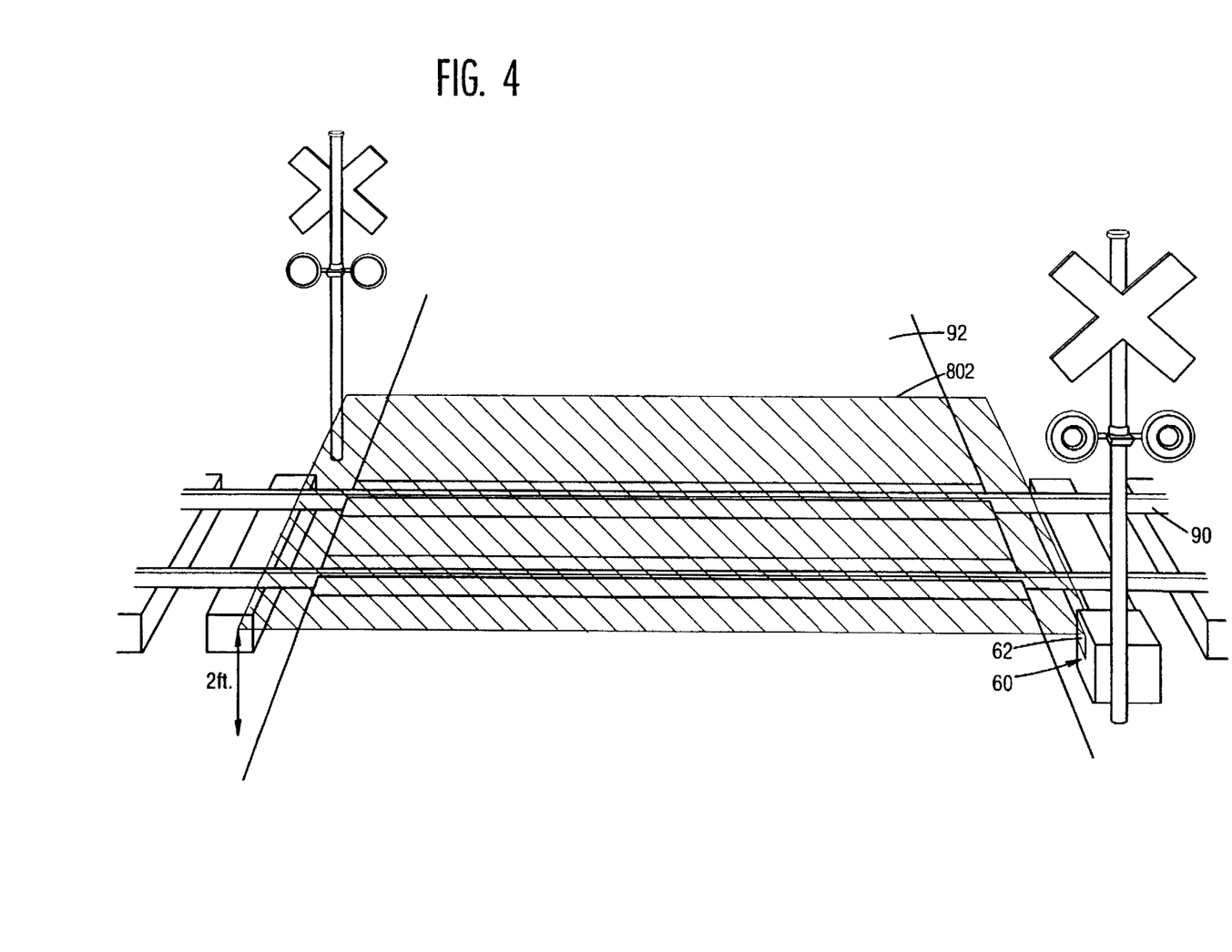
FIG. 4 is a schematic illustration of the detection system installed at a railroad crossing.
Figure 5:
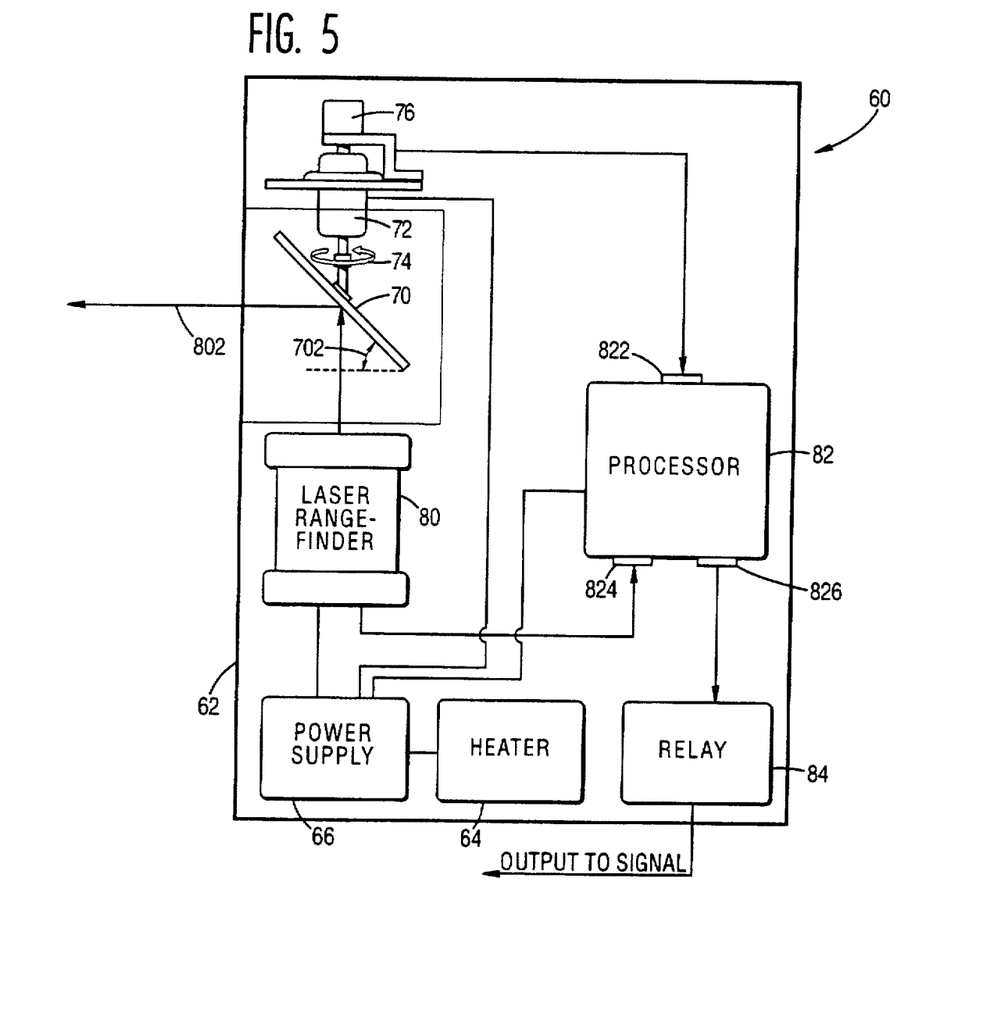
FIG. 5 is a block diagram of the components of the detection system of FIG. 4.

The system 60 for the application of detecting the presence of an object on a portion of a railroad track 90 generally adjacent and encompassing a crossing by a roadway 92 is illustrated in FIGS. 4 and 5. The system 60 comprises a mirror 70 and an electric motor 72 for rotating the mirror 70 over a predetermined angle in a plane generally parallel to ground. For this application the scan angle 74 is in the range of 90 degrees.

The laser rangefinder 80, which may be a Riegl LD90-3100 pulsed laser rangefinder (Riegl Laser Measurement Systems, Orlando, Fla.), comprises a laser adapted to emit a beam 802. The mirror 70 is mounted so that the beam 802 travels generally upward, impinging on the mirror 70 at an angle 702 of approximately 45 degrees in the plane of FIG. 5. The rotation, which is effected by the motor 72 is in a generally horizontal plane (perpendicular to the plane of FIG. 5, as shown by the arrow). The mirror's 70 angular position is measured with the use of a mechanical angle encoder 76 connected to the motor 72.

The rangefinder 80 scans the railroad track 90 over a predetermined area comprising a predetermined length and a predetermined width at a height of approximately 2 feet. It is adapted to sense the presence of an object of a width generally greater than 4 inches, although these parameters can of course be adjusted to suit the needs of a particular location and/or application.

The processor 82 contains software for driving the motor 72 over a predetermined scanning pattern. An exemplary scanning pattern includes taking 180 samples per scan, which achieves the size goal stated above. If the rangefinder 80 is run at 100 Hz, each scan should take 1.8 sec. The processor 82 receives information from the angle encoder 76 and the rangefinder 80 via a first RS232 port 822 and a second RS232 port 824, respectively.

Any object crossing the scanning plane 802 of the laser and exceeding the predetermined minimum width, calculated as a function of the scan and measurement rates, will be detected by the system 60 and determined by the processor 82 to be a range measurement lying within the bounded area over the crossing. This information is communicated via RS422 port 826 from the processor 82 to the relay package 84, which can drive up to four relays for external communication of warning signals to, for example, an oncoming train.

The processor 82 can also utilize the obtained scan data to determine the object's approximate width and thereby create a two-dimensional map of the facing side of the object. Recognition software within the processor 82 can also provide an identification of the object if it matches a test object stored therein.

The processor 82 can also determine when a previously sensed object has vacated the predetermined area and output a signal indicative of the absence of the object, which can be used to reset the warning signal to a clear condition.

As previously, the system 60 includes a housing 62 and a heater 64 for protecting the rangefinder 80 and the processor 82 from adverse environmental conditions.

The power supply 66 provides power to the rangefinder 80, the motor 72, the computer 82, and the heater 64.

It may be appreciated by one skilled in the art that additional embodiments may be contemplated, including similar systems for object detection and accident aversion.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A system for detecting the presence of an object on a portion of a railroad track, the system comprising:

means for performing an optical scan of a predetermined length of railroad track;

means for sensing from the scanning means a presence of an object along the predetermined length of track;

means for determining a position of the sensed object from the scanning and sensing means; and means for providing a signal indicative of the presence and position of the sensed object.

2. The object detection system recited in claim 1, wherein the sensing means comprises means for sensing the presence of an object having a dimension greater than a predetermined size.

3. The object detection system recited in claim 2, further comprising means for calculating a two-dimensional size of the sensed object.

4. The object detection system recited in claim 1, further comprising means for protecting the system from adverse climatic conditions.

5. The object detection system recited in claim 1, wherein the optical scanning and position-determining means comprises a pulsed laser rangefinder.

6. The object detection system recited in claim 5, wherein the optical scanning means further comprises a movable platform controllable over a tilt and a pan axis.

7. The object detection system recited in claim 6, wherein the position-determining means further comprises a processor in communication with the rangefinder for processing range data therefrom and calculating a position of a sensed object.

8. The object detection system recited in claim 7, wherein the optical scanning means further comprises the processor in controlling communication with the platform for directing a movement thereof.

9. The object detection system recited in claim 7, further comprising means for resetting the system following a removal of the sensed object.

10. The object detection system recited in claim 8, wherein the optical scanning means emits an optical beam generally harmless to a human eye.

11. The object detection system recited in claim 8, wherein the processor further comprises means for integrating the range data collected from the sensed object to form a partial three-dimensional image thereof.

12. The object detection system recited in claim 11, wherein the processor further comprises:

a stored library of test objects;

means for comparing the partial three-dimensional image of the sensed object with the stored library; and means for identifying the sensed object from the comparison if a match within predetermined limits is found between the sensed object and a test object.

13. A system for detecting the presence of an object on a portion of a railroad track, the system comprising:

a pan-tilt platform;

a laser rangefinder mounted to the pan-tilt platform for scanning a railroad track over a length of approximately 200 feet, a width of approximately 15 feet, and a height of approximately 5 feet, and for sensing a presence of an object of a two-dimensional size generally greater than 10 inches by 10 inches;

a processor comprising:

means for driving the pan-tilt platform over a predetermined scanning pattern;

means for determining from the rangefinder a position of the sensed object; and means for outputting a signal indicative of the presence and position of the sensed object; and a housing and a heater for protecting the rangefinder and the processor from adverse environmental conditions.

14. The object detection system recited in claim 13, wherein the processor further comprises means for storing a time history of the presence, the size, and the position of all sensed objects.

15. The object detection system recited in claim 13, wherein the processor further comprises means for communicating with a second processor residing at a location remote from the system.

16. The object detection system recited in claim 15, wherein the processor further comprises means for implementing a control signal from the second processor for altering a system parameter remotely.

17. The object detection system recited in claim 16, wherein the processor further comprises means for performing a diagnostic test on a system component for relaying system data to the remote location.

18. A system for detecting the presence of an object on a portion of a railroad track generally adjacent and encompassing a crossing by a roadway, the system comprising:

a mirror;

means for rotating the mirror over a predetermined angle in a plane generally parallel to ground;

a laser rangefinder comprising a laser adapted to emit a beam and mounted so that the beam impinges on the mirror, the rangefinder for scanning a railroad track over a predetermined volume comprising a predetermined length and a predetermined width at a predetermined height, and adapted to sense a presence of an object within a scanning plane of a size generally exceeding a predetermined size;

a processor comprising:

means for driving the mirror rotating means over a predetermined scanning pattern;

means for determining from the rangefinder a position of the sensed object; and means for outputting a signal indicative of the presence and position of the sensed object, for setting a warning signal receivable by an oncoming train; and a housing and a heater for protecting the rangefinder and the processor from adverse environmental conditions.

19. The object detection system recited in claim 18, further comprising:

means for sensing when the sensed object has vacated the predetermined volume; and means for outputting a signal indicative of the absence of the previously sensed object for resetting the warning signal to a clear condition.

20. A method for detecting the presence of an object on a portion of a railroad track, the method comprising the steps of:

performing a directed-energy scan of a predetermined length of railroad track;

sensing from the scan a presence of an object along the predetermined length of track;

determining a position of the sensed object from the scanning and sensing steps; and providing a signal indicative of the presence and position of the sensed object.

21. The method recited in claim 20, further comprising the step of calculating a two-dimensional size of the sensed object.

22. The method recited in claim 20, further comprising the step of providing a second signal indicative of the vacating of the sensed object from the railroad track length.

* * * * *